Aug. 25, 1953

F. TOTZEK 2,650,160

PRODUCTION OF IRON SPONGE FROM IRON ORE

Filed Jan. 31, 1950

INVENTOR.
FRIEDRICH TOTZEK.

BY Thomas J. P. O'Brien
his ATTORNEY.

Aug. 25, 1953
F. TOTZEK
2,650,160
PRODUCTION OF IRON SPONGE FROM IRON ORE
Filed Jan. 31, 1950
2 Sheets-Sheet 2
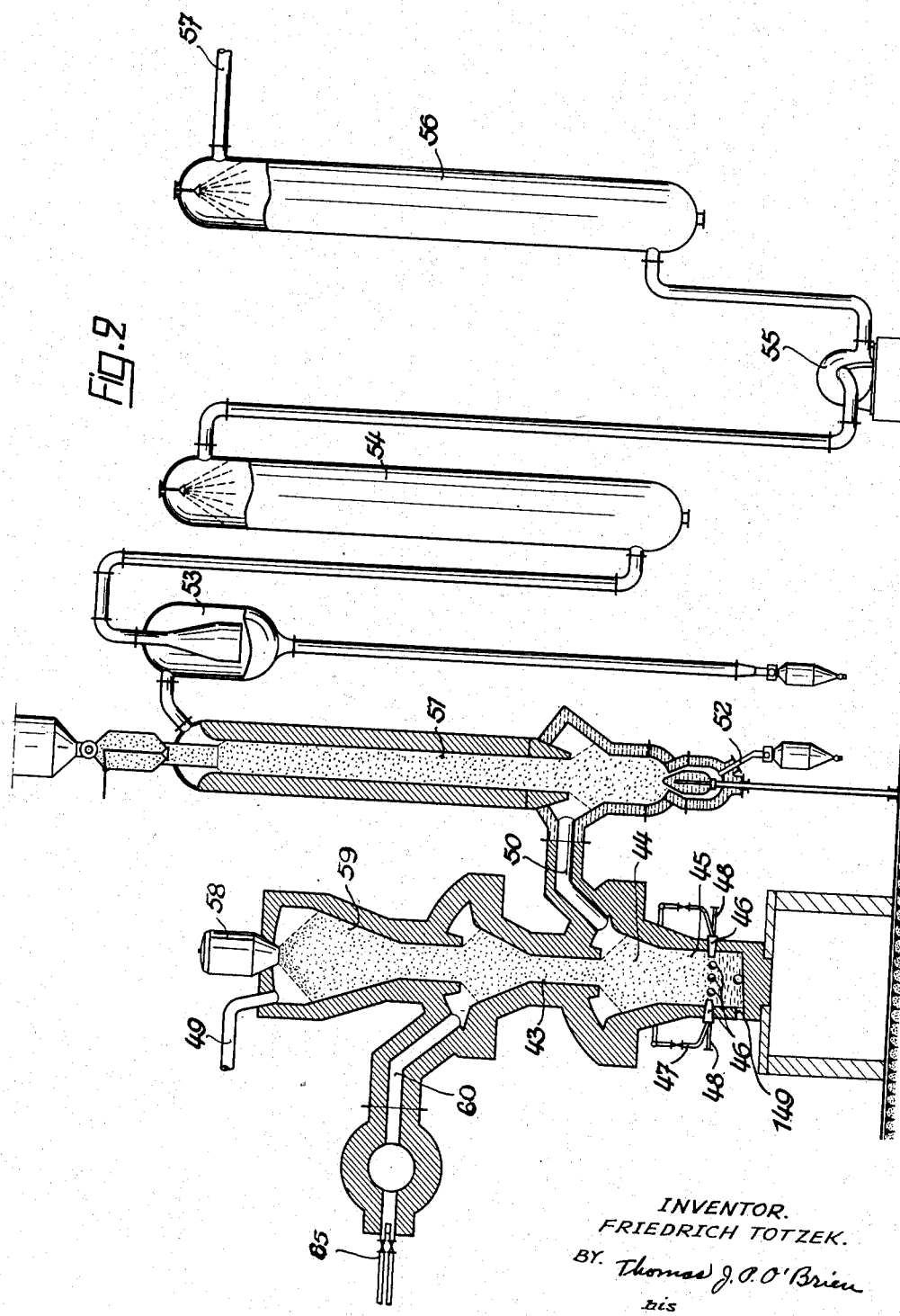
INVENTOR.
FRIEDRICH TOTZEK.
BY Thomas J. O'Brien
his
ATTORNEY.

Patented Aug. 25, 1953

2,650,160

UNITED STATES PATENT OFFICE 2,650,160

PRODUCTION OF IRON SPONGE FROM IRON ORE

Friedrich Totzek, Essen (Ruhr), Germany, assignor to Koppers Company, Inc., Pittsburgh, Pa., a corporation of Delaware Application January 31, 1950, Serial No. 141,363
In Switzerland February 5, 1949

6 Claims. (Cl. 75—34)

The present invention relates to the production of metallic iron from iron ores and more particularly relates to the reduction of iron oxides contained in ores at temperatures below the melting point of metallic iron and the gangue.

Almost all wrought iron is produced today by the indirect method, i. e. in the well-known blast furnace. In the blast furnace a pig iron is primarily produced that contains considerable quantities of other matter. This primary pig iron has to be subjected to a purification, the so-called fining, in order to convert it into wrought iron.

In addition to the production of wrought iron by way of the blast-furnace process it has also been attempted to produce such iron directly from the ore. An important advantage of such a direct production of wrought iron is the special quality of the iron produced at temperatures below its melting point, such iron—known as sponge iron—being an excellent base for the manufacture of high-grade steels.

So far, however, the efforts to produce wrought iron directly from ores has had no success economically.

It is an object of the present invention to provide for such improved method and apparatus for the production of wrought iron directly from the ore that make production of this kind of iron more efficient and economical and which permit the use of cheap and almost universally available, mineral fuels or other solid fuels as a reduction medium.

A further object of the present invention is to provide improvements which during the direct production of wrought iron will make possible the production of a valuable spent gas from the reducer suitable in particular for the synthesis of hydrocarbons from carbon monoxide and hydrogen.

A further object of the invention is to provide improved method and apparatus for the direct production of wrought iron from iron ores that permit the reduction of the iron ore with a reducing gas containing carbon monoxide, and without requiring heat additional to the sensible heat of synthesis make gas, as the reducing gas, to be generated to be transferred to the ore to be treated.

It is well-known practice to produce metallic iron from iron ore by reduction of the ore with gases rich in carbon monoxide in a vertical shaft through which the ore moves slowly downwards. The said gases are recycled through the shaft and a chamber connected therewith wherein the used gas, that is enriched with carbon dioxide by the reduction of the ore, is brought into contact with the solid carbonaceous fuel at elevated temperatures in order to convert such carbon dioxide into carbon monoxide. Simultaneously, this recycled gas is heated to a high temperature, preferably to about 1000° C., which is still below the melting point of metallic iron and the gangue. The preheated gas during its passage from the bottom to the top through the reduction shaft gives up to the charge that heat required for the reduction of the ore and for preheating it.

It has been also suggested to use oxygen-enriched air and coal for the production of wrought iron from iron ore by reduction at temperatures below the melting point of the iron. This suggestion, however, has so far not met with any practical realization, whereas the introduction of air enriched with oxygen as blast into the blast furnace has already been practised with some success. The reason that no great advantage has so far been observed in the use of air enriched with oxygen for the direct production of wrought iron may reside in the fact that the operating temperature in this process is markedly lower than that in the blast furnace so that the temperature employed in the usual gas producers for producing gases rich in carbon monoxide and the calorific value of the so-produced gas are sufficient to meet the heat requirement of the reduction shaft used for the production of wrought iron.

Now, an important characteristic of the present invention is the direct production of wrought iron from iron ore at temperatures below the melting point of the iron and of the gangue by a reducing gas that contains more than 70% by volume of carbon monoxide and hydrogen, preferably 85%, and has a temperature of about 1000° C. and is produced by gasifying a solid fuel with oxygen, this so-formed hot reducing gas being brought into contact in a shaft furnace with the ore to be processed.

In the following specification and in the claims the term "oxygen" includes pure oxygen, oxygen-enriched air, preferably air containing more than 85% of oxygen.

In order to make possible the production of wrought iron by reduction of iron ore at temperatures below 1000° C. while utilizing solid fuels of any kind, the invention employs preferably a gas-producing method described in my copending application, U. S. Serial No. 43,950, filed August 12, 1948, which comprises preparing synthesis make gas from finely-divided solid fuel and oxygen as homogeneous as possible a suspension of a solid fuel and oxygen in such a ratio that the carbon of the fuel is converted at least into carbon monoxide, and thereafter introducing this suspension in the form of a jet into a gasification chamber operated at a high temperature wherein the suspension is quickly ignited, carbon monoxide being formed along with a small quantity of carbon dioxide.

In this synthesis (Fischer Tropsch) gas gasification method very high temperatures occur in the reaction or gasification chamber. In order to protect the walls of the reaction chamber from deterioration by the high reaction temperatures the inventor has provided in his copending application for the simultaneous, continuous introduction into the reaction chamber of a medium that reacts endothermically with carbon, e. g. steam or carbon dioxide, and in such a manner that between a central highly heated zone of maximum temperature and the walls of the reaction chamber a continuous flow of the endothermically reacting medium is maintained which envelops the central zone of maximum temperature and cools the gas by its formation of carbon monoxide with the residual carbon in the central zone. This make gas later must be cooled, in any event, to about 250° C. for the Fischer Tropsch synthesis, because the latter is an exothermic reaction, generating heat, which must be held down by cooling.

Instead of an endothermically reacting medium, according to the present invention, carbon monoxide or a mixture of carbon monoxide and said endothermically reacting media (steam and/or carbon dioxide) may advantageously be introduced into the reaction chamber as a protective means. The quantity of the endothermically reacting media allowed in the protective gas depends essentially on the reactivity of the solid pulverized fuel to be gasified. If the reactivity of the fuel is great, a comparatively large quantity of steam and/or carbon dioxide may be added because the endothermically reacting media quickly react with the fuel with the formation of carbon monoxide and hydrogen. In the case, however, of a solid fuel having a low reactivity, the addition of endothermically reacting media to the protective gas must be reduced and under certain circumstances to be abandoned altogether.

The synthesis make gas that is required to reduce the iron ore, and which contains carbon monoxide and hydrogen as aforesaid can be produced, from a lump fuel, for example coke or a non-caking coal that is poor in volatile matter and in tar, such as anthracite, in a gas-producer with a stationary fuel bed from which the ash is discharged in a molten state, the gas produced being drawn off at a temperature of about 1000° C., while the oxygen required for the gasification is introduced through nozzles or tuyères provided in the lower part of the gas-producer. The nozzles are connected to a pipeline feeding carbon monoxide or a medium reacting endothermically with carbon, such as steam and/or carbon dioxide or a mixture of carbon monoxide and a medium reacting endothermically with carbon, in such a way that oxygen and carbon monoxide will contact each other at the mouth of the nozzle. The nozzles or tuyères are so arranged and their distance from one another are so chosen that in the bottom part of the gas-producer a coherent melting zone is formed.

In a gas-producer of this type the inventor has produced a gas containing carbon monoxide and hydrogen up to 95% at a temperature of about 1000° C.

Using a reducing gas prepared according to this invention, the reduction of the iron ore will be readily and quickly performed and in a comparatively small reaction apparatus and to such a degree, by the heat of synthesis make gas, that a product is made wherein about 85% of the iron is contained in elementary form. Such an iron product can forthwith be converted into steel in the usual electric furnaces by reduction of the residual iron oxide.

The invention also contemplates the reduction of iron ore at temperatures of about 1000° C. by performing the reduction at superatmospheric pressure with a reducing gas containing carbon monoxide and hydrogen that has itself been produced at superatmospheric pressure. The invention preferably employs 10–15 atmospheres above normal pressure.

By increasing the pressures during both the reaction for the gasification of the fuel and for the reduction of the iron ore the rate of the reactions is increased with the result that the size of the required apparatus may be reduced correspondingly. The reduction of the iron ore, especially, proceeds at a very high rate under increased pressure. It is also possible to decrease significantly the flow-rate of the reducing gas within the reaction chamber that is charged with iron ore, thus making possible treatment of iron ores of small particle sizes and also those iron ores that tend to disintegrate during reduction.

The higher flow resistance encountered by the reducing gas flowing through a column of finely grained iron ore is readily overcome by increasing the pressure of the producer gas. Moreover, according to the invention, the flow of the reducing gas through the burden may be facilitated by admixing with the iron ore a lumpy material that does not participate in the reaction, for example, coke which after the reduction of the ore is separated from the product by screening, or in any other suitable way, and can then be reused in the burden to promote its permeability to the reducing gases.

When there is employed a lumpy carbonaceous material, for example coke or low-temperature coke of sufficient reactivity, for improving the flow of the gas through the burden of the reduction shaft, methane may be formed by the reaction of carbon monoxide with hydrogen according to the equation, $2CO+2H_2=CH_4+CO_2$. In this way a gas of high calorific value may be obtained as an alternative, which may be later utilized advantageously, for example, to melt the produced sponge iron in hearth furnaces or the like instead of for synthesis of hydrocarbons.

The gas leaving the reducing stage of the process according to the invention contains besides carbon dioxide also considerable quantities of carbon monoxide and hydrogen. When using, for example, gas containing 82.5% CO and 13% $H_2$ and 2% $CO_2$ there is produced by the reduction a gas containing about 34% CO, 7.5% $H_2$ and 50.5% $CO_2$ along with steam and a small quantity of nitrogen (about 2%) depending of course on the purity of the oxygen used.

Such a gas, after removal of the carbon dioxide by scrubbing it, for example, with water at superatmospheric pressure, may be utilized advantageously for the production of hydrocarbons or other valuable products.

A portion of the carbon dioxide removed from the gas in the manner above-described can be recycled into the gasification stage of the process or into any other suitable apparatus wherein carbon dioxide is converted into carbon monoxide by reaction with carbon thus augmenting the carbon monoxide content with conservation of fuel to produce the augmentation of carbon monoxide.

In the accompanying drawings forming part of this specification and showing for purposes of exemplification preferred apparatus and method in which the invention may be embodied and practised but without limiting the claimed invention to such illustrative instance or instances:

Fig. 2 shows diagrammatically a reduction apparatus which employs a lump fuel, for example, coke in the gasifying stage.

Figure 1:
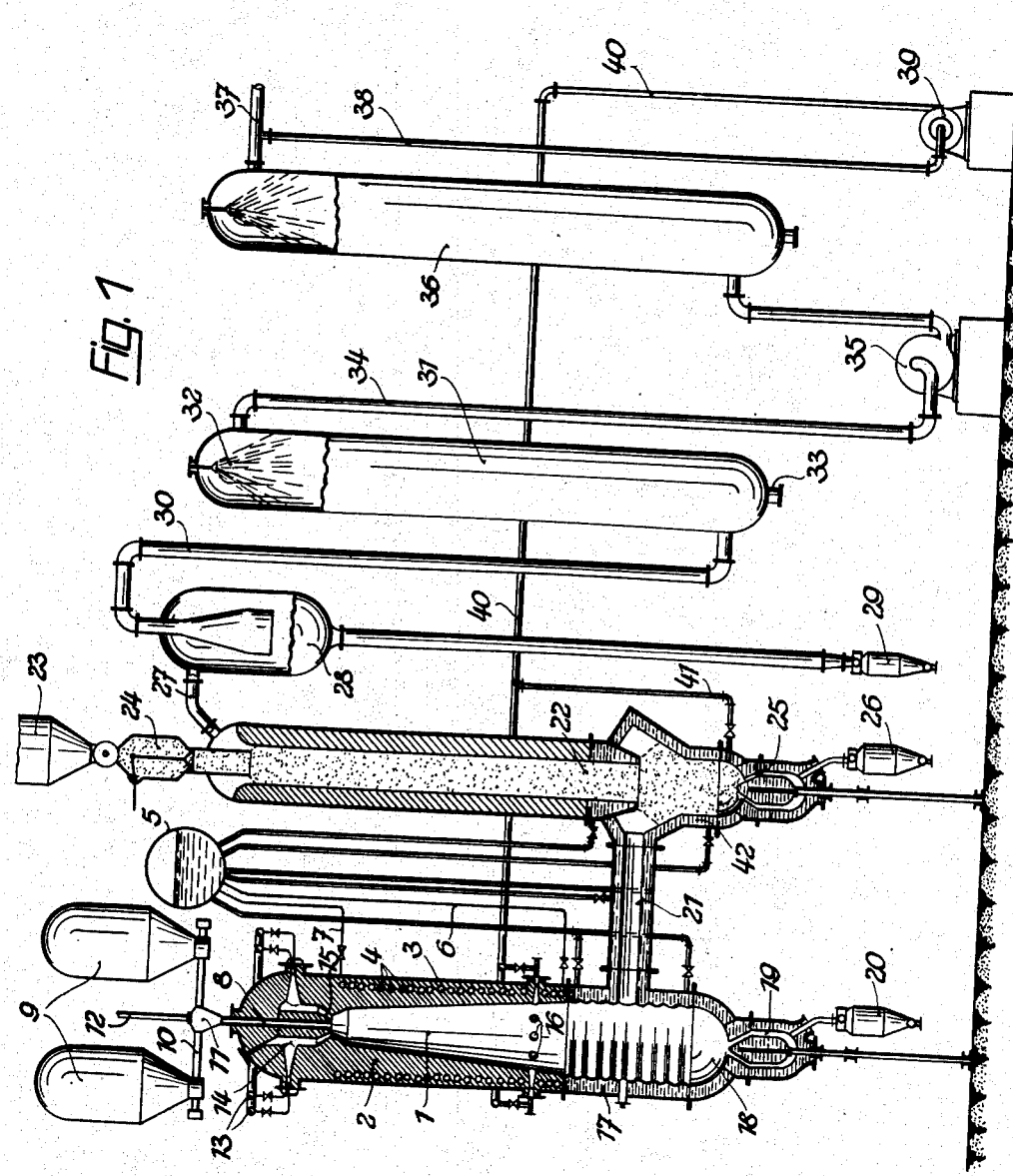
Fig. 1 shows a unit designed according to the invention to reduce iron ore by gasifying a finely-divided solid fuel.

Referring now to Fig. 1 of the drawings for practising the invention with finely-divided solid fuel, there is used for the gasification step a vertical shaft 1 that increases in cross-section from the top downwards, and is lined with refractory brickwork 2, which is arranged in a gas-tight casing 3, made of sheet steel, or the like. In the refractory brickwork 2 are provided cooling-coils 4 into which cooling water flows by gravity from an overhead container 5 through pipeline 6 whence the heated water is recycled, through pipeline 7, back to the overhead container 5.

Into the upper narrower end of the shaft 1 leads coaxially a nozzle or tuyère 8 that is provided with water-cooling, and there is fed through this nozzle into the gasification shaft a homogeneous mixture of finely-divided pulverized fuel and oxygen in the form of a jet.

The finely-divided fuel to be gasified is fed from a storage bin 9 by means of a conveying worm 10 into a mixing device 11 into which there is fed, through pipeline 12, oxygen at elevated pressure. The formation of a homogeneous mixture of oxygen and pulverized fuel takes place in the chamber 11 at comparatively low temperatures so that the mixture ignites only within the gasification shaft 1 on leaving nozzle 8.

The storage bins 9 are designed in such manner that the oxygen fed into the mixing device may not pass into the storage bin 9.

The mixture entering through nozzle 8 contains oxygen and pulverized fuel in such a ratio that by the reaction, within the gasification shaft which is operated at high temperatures, preferably carbon monoxide is formed by exothermic reactions in the gasification shaft. The exothermic reaction, by reason of the fineness of the solid fuel and its thorough mixture with the employed oxygen, proceeds at a very high rate, so that almost the whole combustible portion of the fuel is gasified. In the process according to the invention, the fuel is preferably used in such a fineness that on screening on a sieve with 4900 meshes per square centimeter only about 10% remains on the sieve.

In order to protect the walls 2 of the gasification shaft, in the zone of the exothermic reaction, against the very high temperatures prevailing there the invention employs a relatively cold protective gas which flows from the pipelines 13 into the annular chamber 14 which surrounds the nozzle 8 and opens into the gasification chamber 1, by means of an annular nozzle 15 which is arranged coaxially of the water-cooled nozzle 8. The annular nozzle 15 is so designed that the flow of the cold protective gas envelops the zone of exothermic reaction in the center of the shaft and moves along the walls of the gasification shaft in a continuous, coherent flow. The process according to the invention employs advantageously as a protective gas a cold or moderately preheated gas rich in carbon monoxide from the spent gases from the iron oxide reduction step. However, a certain quantity of steam and/or carbon dioxide, depending on the nature and reactivity of the solid fuel to be processed may be added to the protective gas as previously mentioned.

In the lower part of gasification shaft 1 are provided additional openings 16 for the introduction of additional quantities of a cold gas rich in carbon monoxide which serve the purpose of quickly reducing the temperature of the reaction gases leaving the gasification shaft 1 to about 1000° C. The wanted sudden reduction in gas temperature is augmented by providing the lower end of the gasification shaft with a cooling jacket 17 which is communicably connected with the overhead container 5 for cooling water.

The solid residue produced in the gasification of the solid fuel settles on the bottom of the cooling jacket 17 at Figure 18 and may be withdrawn through the discharge device 19 into the ash box 20.

The produced gas rich in carbon monoxide containing also hydrogen leaves through pipeline 21 and flows directly into the reduction shaft 22 charged with iron ore as the burden.

The reduction shaft 22 as well as the gasification shaft 1 is enclosed in a gas-tight casing. The ore to be processed leaves bunker 23 and is fed by way of a lock-seal 24 into the top of said reduction shaft 22. Ore and reducing gas flow countercurrently through the shaft 22.

In practising the invention as indicated in Fig. 1 of the drawings all the produced hot reducing gas is fed into the reduction shaft 22 at the lower end. Under circumstances it may be advantageous to introduce part of the hot reducing gases directly into higher levels of the reduction shaft. The reduction shaft 22 is preferably operated in such a manner that a temperature of about 1000° C. is maintained throughout the largest portion of its length. The material, treated with the reducing gas, may be drawn off from shaft 22 by discharge device 25 into a receiver 26 for further utilization. Under favorable conditions it contains about 85% of elementary iron so that it may readily be converted into liquid steel in an electric or hearth furnace by reducing the residue of iron oxide. The produced iron may also be concentrated by treating it with magnets or by other suitable methods. The top-gas leaves through pipeline 27 that leads to a dust separator 28 where any suspended ore particles can settle. The settled particles may be drawn off into receiver 29. The gas, relieved of any suspended matter, passes through pipeline 30 into a scrubber 31 which is operated at essentially the same pressure as the reduction shaft 22 and thence into the dust separator 36. In the scrubber 31 the gas is brought into contact with water injected through spray 32 and discharged at the bottom at outlet 33. The scrubber 31 operates chiefly as a cooler, but in addition, considerable quantities of impurities are also separated.

The scrubbed gas is then completely cleaned of any entrained particles and impurities in a disintegrator 35 or in any other suitable apparatus and passes into another scrubber 36, from where it is discharged at 37 for further utilization.

If the scrubber 36 is operated at superatmospheric pressure, absorption of carbon dioxide takes place, so that the gas leaving at 37 consists practically of carbon monoxide and hydrogen with comparatively minor content of carbon dioxide and nitrogen.

From pipeline 37 part of the produced gas may be drawn off through pipeline 38, pump 39 and pipeline 40 and be fed to the openings 16 into the gasification shaft 1 for cooling purposes.

In addition, cold gas from pipeline 40 may also be fed through branch line 41 into the lower part 42 of the reduction shaft 22 which is constructed and serves as a cooling jacket in order to cool the reduced ore settling there before it is discharged.

By means of pipeline 37 the carbon monoxide may also be used as a protective gas in the gasification shaft 1 by feeding it into pipeline 13. In the gasifier, a fuel is advantageously used which is poor in both volatile matter and water so that the adjusting of the water-gas equilibrium is established in the absence of steam or at least only in the presence of small quantities of steam.

The apparatus shown in Fig. 2 uses for the production of the reducing gas a lump fuel, preferably coke. The coke from the storage 58 enters at first the chamber 59 where the coke is treated with hot gases which, for example, are fed through pipeline 60 from burners 85 and are discharged through pipeline 49 in such a manner that the coke is dried and preheated to about 300° C. The fuel preheated in this way passes through the narrowed portion 43 into the gas-producer 44 which is so operated as to fuse the fuel ash.

Into the narrowed lower part 45 of the gas-producer 44 lead a number of nozzles 46 through which oxygen is fed from pipe 47 into the gasification shaft. Steam enters simultaneously with the oxygen through the nozzles from pipeline 48 into the gas-producer and in such quantity that practically the whole steam fed is decomposed with the formation of carbon monoxide and hydrogen.

Instead of, or in addition to steam, carbon dioxide may be fed, as in the case of Fig. 1, from the spent gases from the reducer 51 into the gas-producer through nozzles 46. The carbon dioxide is converted in the gas-producer into carbon monoxide by reacting with carbon at the high temperature prevailing there.

Finally, it is also possible to feed carbon monoxide through the nozzles 46, as in the case of Fig. 1, from the spent gases from the reducer 51. The carbon monoxide, however, should mix and combine with the oxygen only at the end of the nozzle. In practising the invention in this manner synthesis make gas suitable for conjoint use as a reducing gas is obtained which consists almost wholly of carbon monoxide as aforesaid except that it will contain small quantities of carbon dioxide and steam, if dry solid fuels free of tars are used, as, for example, coke.

The gas producer 44 is operated in such a manner that on its bottom a coherent zone is formed where the fuel ash melts. The molten slag is discharged at 149.

The gas produced in the gas-producer 44 is discharged through pipeline 50 at a temperature of about 1000° C. and fed into the bottom of the reduction shaft 51 in which it comes into contact with the iron ore to be reduced. The reduction shaft 51 is constructed in principle similar to the reduction shaft 22 of Fig. 1 and is operated in the same manner. The reduced material is discharged at 52, the gas passes after leaving the shaft 51 into a dust separator 53, thence into a scrubber and cooler 54 and thereafter via the disintegrator 55, or the like, into scrubber 56 which serves to remove impurities and also to scrub out carbon dioxide as described at the washer 36 of Fig. 1.

The purified gas is discharged at 57.

The invention as hereinabove set forth is embodied in particular form and manner but may be variously embodied within the scope of the claims hereinafter made.

I claim:

1. A method of reducing sponge iron ore comprising reacting a solid carbonaceous fuel with a gas containing at least 85% oxygen at above temperatures suitable for the reduction of sponge iron ore to produce a reducing gas containing at least 70% by volume carbon monoxide and hydrogen, the preponderant proportion of said reducing gas being carbon monoxide, cooling said reducing gas to about 1000° C., contacting said reducing gas with said sponge iron ore in an amount sufficient to reduce said iron ore to at least 85% metallic iron and to produce a spent reducing gas containing substantially carbon monoxide, hydrogen, and carbon dioxide, and removing carbon dioxide from said spent reducing gas.

2. A method of reducing sponge iron ore comprising reacting a solid carbonaceous fuel with a gas containing at least 85% oxygen at above temperatures suitable for the reduction of sponge iron ore to produce a reducing gas containing 82.5% carbon monoxide, 13% hydrogen, and 2% carbon dioxide, cooling said reducing gas to about 1000° C., contacting said reducing gas with said sponge iron ore in an amount sufficient to reduce said iron ore to at least 85% metallic iron and to produce a spent reducing gas containing 34% carbon monoxide, 7.5% hydrogen, 50.5% carbon dioxide and about 2% nitrogen, and removing said carbon dioxide from said spent reducing gas.

3. A process of claim 1 in which part of the spent reducing gas is recycled and contacted with the hot reducing gas to aid in cooling said reducing gas to 1000° C.

4. A process of claim 1 in which the carbon dioxide removed from the spent reducing gas is recycled and contacted with the hot reducing gas to aid in cooling said reducing gas to 1000° C.

5. A process of claim 1 in which the cooling of the reducing gas to about 1000° C. is accomplished by endothermic reaction of the hot reducing gases with an agent chosen from the class consisting of carbon dioxide and steam in order to cool said reducing gas to about 1000° C.

6. A process of claim 1 in which the steps of producing the reducing gas and contacting it with the sponge iron ore are carried out at superatmospheric pressures.

FRIEDRICH TOTZEK.

References Cited in the file of this patent

UNITED STATES PATENTS

| Number | Name | Date |
|---|---|---|
| 812,247 | Westman | Feb. 13, 1906 |
| 1,742,750 | Bradley | Jan. 7, 1930 |
| 1,799,885 | Chavanne | Apr. 7, 1931 |
| 2,048,112 | Gahl | July 21, 1936 |
| 2,142,100 | Avery | Jan. 3, 1939 |
| 2,170,265 | Karwat | Aug. 22, 1939 |
| 2,302,157 | Totzek | Nov. 17, 1942 |
| 2,593,257 | Bradley | Apr. 15, 1952 |